(12) United States Patent
Cai et al.

(10) Patent No.: US 11,888,123 B2
(45) Date of Patent: Jan. 30, 2024

(54) ELECTRODE PLATE, BATTERY CELL, AND BATTERY

(71) Applicant: Ningde Amperex Technology Ltd., Ningde (CN)

(72) Inventors: Zhenghuang Cai, Ningde (CN); Hai Long, Ningde (CN)

(73) Assignee: Ningde Amperex Technology Ltd., Ningde (CN)

( * ) Notice: Subject to any disclaimer, the term of this patent is extended or adjusted under 35 U.S.C. 154(b) by 714 days.

(21) Appl. No.: 16/652,471

(22) PCT Filed: Mar. 24, 2020

(86) PCT No.: PCT/CN2020/080871
§ 371 (c)(1),
(2) Date: Oct. 1, 2020

(87) PCT Pub. No.: WO2020/192651
PCT Pub. Date: Oct. 1, 2020

(65) Prior Publication Data
US 2021/0218067 A1 Jul. 15, 2021

(30) Foreign Application Priority Data
Mar. 26, 2019 (CN) .......................... 201910234662.8

(51) Int. Cl.
*H01M 10/0587* (2010.01)
*H01M 50/538* (2021.01)
(Continued)

(52) U.S. Cl.
CPC ......... *H01M 10/0587* (2013.01); *H01M 4/13* (2013.01); *H01M 4/366* (2013.01);
(Continued)

(58) Field of Classification Search
CPC .............. H01M 50/538; H01M 50/543; H01M 10/0587
See application file for complete search history.

(56) References Cited

U.S. PATENT DOCUMENTS

| 7,033,697 B2 | 4/2006 | Park et al. |
| 2013/0048340 A1 | 2/2013 | Bando et al. |
| 2019/0097259 A1 | 3/2019 | Guo et al. |

FOREIGN PATENT DOCUMENTS

| CN | 108400281 A | 8/2008 |
| CN | 201408811 Y | 2/2010 |

(Continued)

OTHER PUBLICATIONS

International Search Report dated Jun. 28, 2020, in corresponding International Application No. PCT/CN2020/080871, 7 pages.

*Primary Examiner* — Christopher P Domone
*Assistant Examiner* — Jonathan William Estes
(74) *Attorney, Agent, or Firm* — Maier & Maier, PLLC

(57) ABSTRACT

The present disclosure provides an electrode plate, a battery cell, and a battery. The electrode plate includes a current collector, a plurality of first electrode tabs, and a plurality of second electrode tabs. The current collector has first and second sides and the first electrode tabs are coupled to the current collector and protrude from the first side. The second electrode tabs, also coupled to the collector, protrude from the second side. The first and second electrode tabs on the electrode plate being arranged on opposite sides of the current collector reduce the internal resistance of the electrode plate, and the energy output efficiency of the electrode plate is improved. The accumulation of heat when the electrode plate is working is reduced. Energy is output at both sides of the electrode plate, which improves the performance of the electrode plate.

5 Claims, 11 Drawing Sheets

(51) Int. Cl.
  *H01M 4/13*  (2010.01)
  *H01M 4/36*  (2006.01)
  *H01M 4/70*  (2006.01)
  *H01M 50/543*  (2021.01)

(52) U.S. Cl.
  CPC ........... *H01M 4/70* (2013.01); *H01M 50/538* (2021.01); *H01M 50/543* (2021.01)

(56) References Cited

FOREIGN PATENT DOCUMENTS

| | | | |
|---|---|---|---|
| CN | 202352786 U | * | 7/2012 |
| CN | 202352786 U | | 7/2012 |
| CN | 104167553 A | | 11/2014 |
| CN | 204885269 U | | 12/2015 |
| CN | 205542997 U | | 8/2016 |
| CN | 205828573 U | | 12/2016 |
| CN | 106848325 A | | 6/2017 |
| CN | 107819101 A | | 3/2018 |
| CN | 108598354 A | | 9/2018 |
| EP | 2187466 A1 | | 5/2010 |
| EP | 2500972 B1 | | 7/2017 |
| JP | 2013206743 A | | 10/2013 |
| WO | 2018/000189 A1 | | 1/2018 |
| WO | WO-2018048095 A1 | * | 3/2018 ............ H01M 10/04 |

* cited by examiner

ELECTRODE PLATE, BATTERY CELL, AND BATTERY

FIELD

The disclosure relates to batteries, and more particularly, to an electrode plate, a battery cell, and a battery.

BACKGROUND

With the development of electronic products and battery-related technologies, people have increasingly higher requirements for performance of the battery. A service life of electronic products directly depends on the performance of the battery. Main parameters affecting the performance of the battery include an energy density and a charge and discharge efficiency of the battery. An electrode plate and an electrode tab are important components of the battery. An internal resistance of the electrode plate affects the charge and discharge efficiency of the battery, and components of an active material layer of the electrode plate affect the energy density of the battery. Thus, improvements to the structures of the electrode plate and the electrode tab becomes an important way to improve the performance of the battery.

SUMMARY

The present disclosure overcomes at least one of the shortcomings of the related art by providing an electrode plate having small internal resistance and high safety. The present disclosure further provides a battery cell having the above electrode plate.

The present disclosure further provides a battery having the above battery cell.

The electrode plate of the present disclosure includes a current collector, a plurality of first electrode tabs, and a plurality of second electrode tabs. The current collector includes a first side and a second side opposite to each other. The first electrode tabs are coupled to the current collector and protrude from the first side. The second electrode tabs are coupled to the current collector and protrude from the second side.

In the electrode plate of the present disclosure, by providing the first electrode tabs and the second electrode tabs on the electrode plate and arranging the first electrode tabs and the second electrode tabs on opposite sides of the current collector, the internal resistance of the electrode plate is reduced. The energy output efficiency of the electrode plate is improved. The accumulation of heat when the electrode plate is working is reduced. Energy is output at both sides of the electrode plate, which improves the performance of the electrode plate.

In some embodiments of the present disclosure, a number of the plurality of first electrode tabs is the same as a number of the plurality of second electrode tabs.

In some embodiments of the present disclosure, the plurality of first electrode tabs and the plurality of second electrode tabs are symmetrical with respect to each other.

In some embodiments of the present disclosure, the plurality of first electrode tabs is misaligned from the plurality of second electrode tabs.

In some embodiments of the present disclosure, the current collector includes a first surface and a second surface opposite to each other, the electrode plate further includes a first active material layer disposed on the first surface and a second active material layer disposed on the second surface. A polarity of the second active material layer is the same as a polarity of first active material layer.

In some embodiments of the present disclosure, the electrode plate includes a first end and a second end, and the first active material layer and the second active material layer are misaligned from each other at the first end.

In some embodiments of the present disclosure, the first active material layer and the second active material layer are aligned or misaligned from each other at the second end.

In some embodiments of the present disclosure, a length of the first active material layer is less than or equal to a length of the second active material layer.

The battery cell of the present disclosure includes a separator and the above electrode plate.

In the battery cell of the present disclosure, by providing the first electrode tabs and the second electrode tabs on the electrode plate and arranging the first electrode tabs and the second electrode tabs on opposite sides of the current collector, the internal resistance of the electrode plate is reduced. The energy output efficiency of the electrode plate is improved. The accumulation of heat when the electrode plate is working is reduced. Energy is output at both sides of the electrode plate, which improves the performance of the electrode plate.

The battery of the present disclosure a packaging casing, an electrolytic solution in the packaging casing, and the above battery cell.

In the battery of the present disclosure, by providing the first electrode tabs and the second electrode tabs on the electrode plate and arranging the first electrode tabs and the second electrode tabs on opposite sides of the current collector, the internal resistance of the electrode plate is reduced. The energy output efficiency of the electrode plate is improved. The accumulation of heat when the electrode plate is working is reduced. Energy is output at both sides of the electrode plate, which improves the performance of the electrode plate.

Additional aspects and advantages of the present disclosure will be given in the following description, and some of them will become apparent from the following description or be learned through the practice of the present disclosure.

BRIEF DESCRIPTION OF THE DRAWINGS

Implementations of the present disclosure will now be described, by way of embodiments, with reference to the attached figures.

SYMBOLS FOR MAIN ELEMENTS

Figure 1:
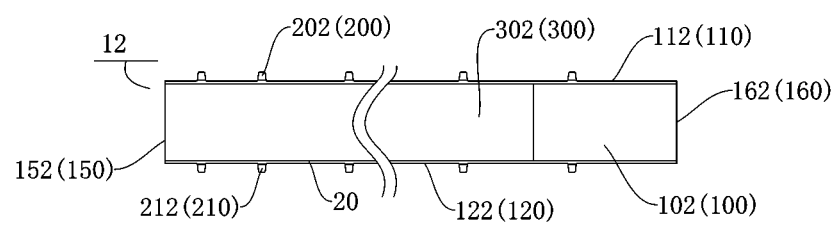
FIG. 1 is a perspective view of an embodiment of an electrode plate according to the present disclosure.

Battery cell 1;
Electrode plate 10, anode electrode plate 11, cathode electrode plate 12;
Current collector 100, anode current collector 101, cathode current collector 102;
First side 110, first anode side 111, first cathode side 112, second side 120, second anode side 121, the second cathode side 122;
First surface 130, first anode surface 131, first cathode surface 132, second surface 140, second anode surface 141, second cathode surface 142;
First end 150, first anode end 151, first cathode end 152, second end 160, second anode end 161, second cathode end 162;
First electrode tab 200, first anode electrode tab 201, first cathode electrode tab 202;
Second electrode tab 210, second anode electrode tab 211, second cathode electrode tab 212;

First active material layer 300, first anode active material layer 301, first cathode active material layer 302;
First anode end surface 3011, second anode end surface 3012, third anode end surface 3013, fourth anode end surface 3014;
Second active material layer 310, second anode active material layer 311, second cathode active material layer 312;
First cathode end surface 3021, second cathode end surface 3022, third cathode end surface 3023, fourth cathode end surface 3024;
Insulating layer 20;
Coating layer 30; and
Adhesive paper 40.

DETAILED DESCRIPTION

Implementations of the disclosure will now be described, by way of embodiments only, with reference to the drawings. The same or similar reference numerals throughout indicate same or similar elements or elements having the same or similar functions. The disclosure is illustrative only, which is not to be considered as limiting the scope of the embodiment.

The battery cell 1 of the disclosure is described by way of embodiments only with reference to FIGS. 1-32. The disclosure is illustrative only, and not to be considered as limiting the scope of the embodiment.

Embodiment 1

Figure 3:
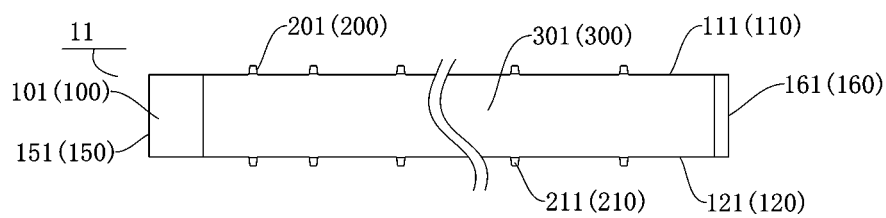
FIG. 3 is a perspective view of an embodiment of an electrode plate according to the present disclosure.
Figure 4:
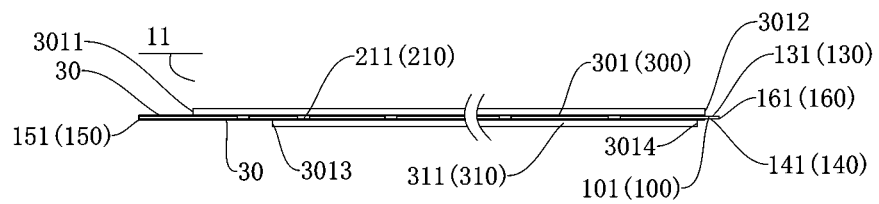
FIG. 4 is a perspective view of an embodiment of an electrode plate according to the present disclosure.
Figure 5:
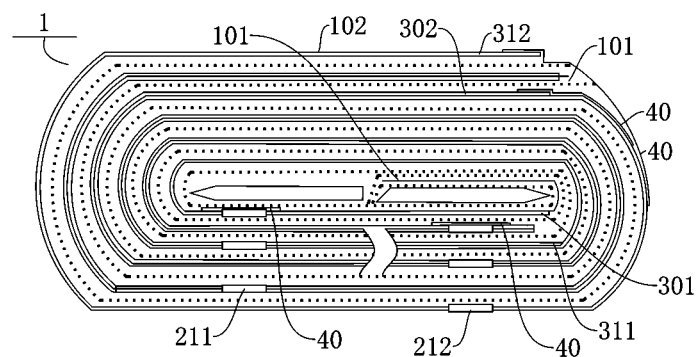
FIG. 5 is a perspective view of an embodiment of a battery cell according to the present disclosure.
Figure 6:
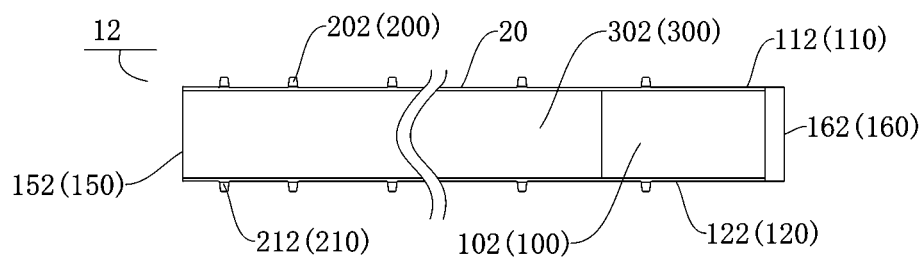
FIG. 6 is a perspective view of an embodiment of an electrode plate according to the present disclosure.
Figure 7:
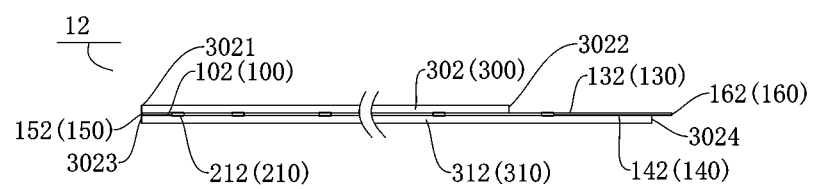
FIG. 7 is a perspective view of an embodiment of an electrode plate according to the present disclosure.
Figure 8:
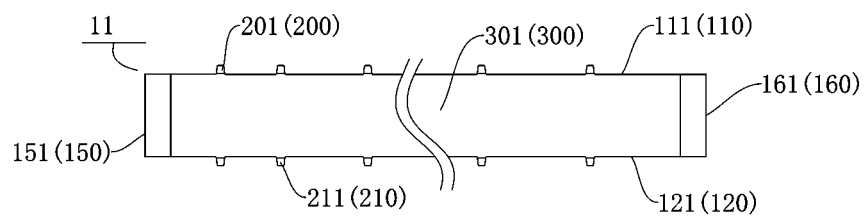
FIG. 8 is a perspective view of an embodiment of an electrode plate according to the present disclosure.
Figure 9:
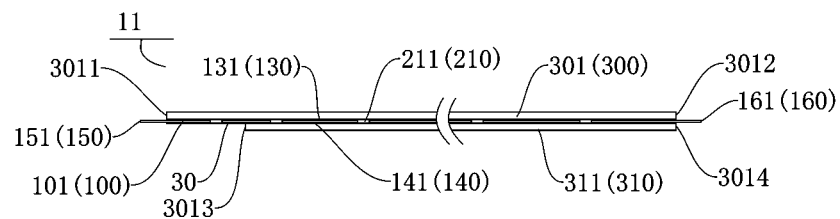
FIG. 9 is a perspective view of an embodiment of an electrode plate according to the present disclosure.
Figure 10:
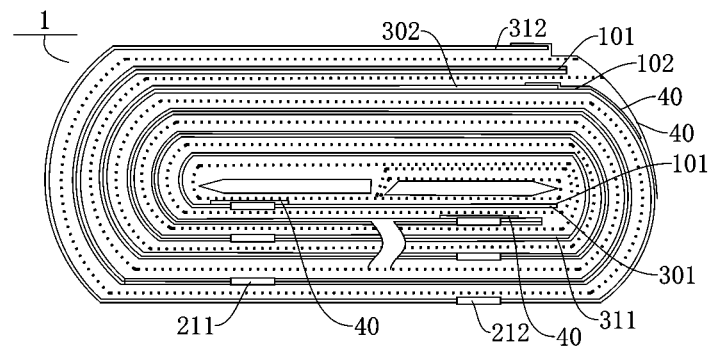
FIG. 10 is a perspective view of an embodiment of a battery cell according to the present disclosure.
Figure 11:
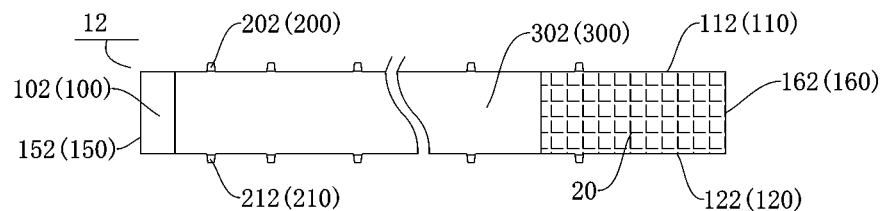
FIG. 11 is a perspective view of an embodiment of an electrode plate according to the present disclosure.
Figure 12:
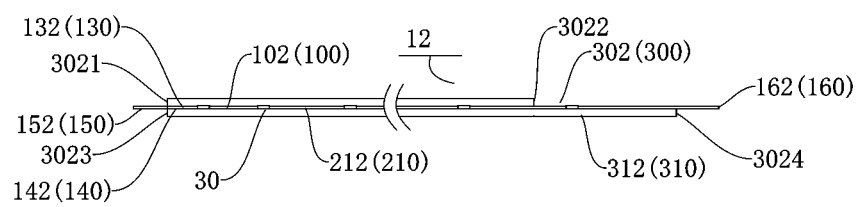
FIG. 12 is a perspective view of an embodiment of an electrode plate according to the present disclosure.
Figure 13:
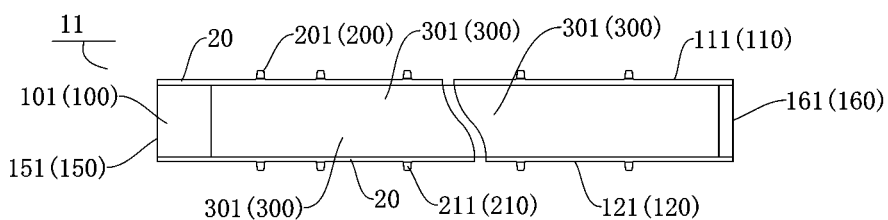
FIG. 13 is a perspective view of an embodiment of an electrode plate according to the present disclosure.
Figure 14:
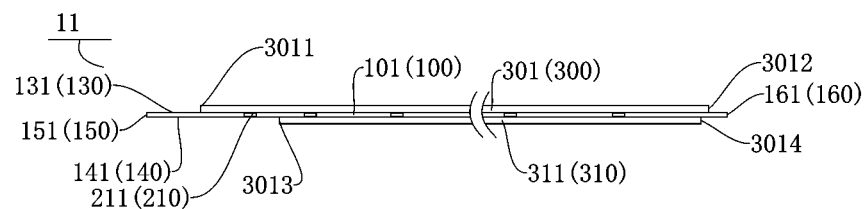
FIG. 14 is a perspective view of an embodiment of an electrode plate according to the present disclosure.
Figure 15:
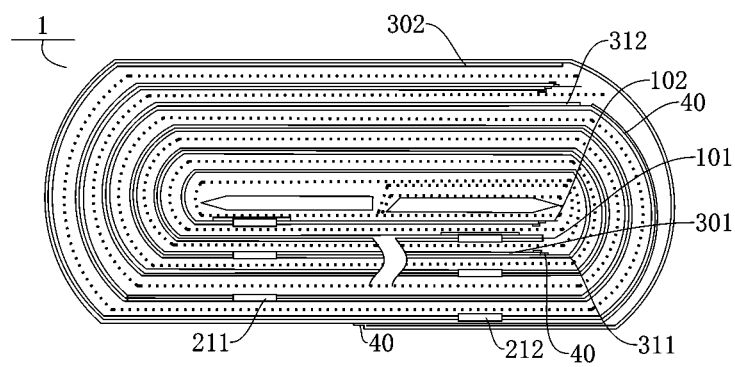
FIG. 15 is a perspective view of an embodiment of a battery cell according to the present disclosure.
Figure 16:
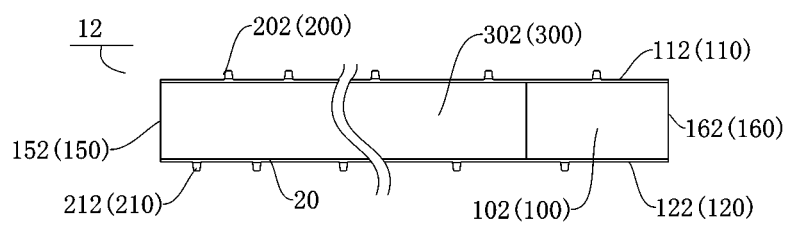
FIG. 16 is a perspective view of an embodiment of an electrode plate according to the present disclosure.
Figure 17:
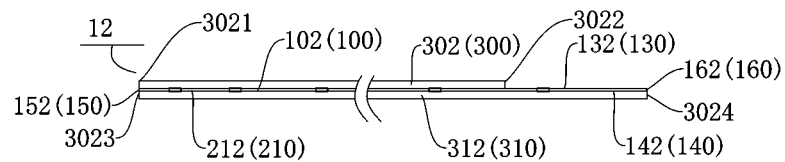
FIG. 17 is a perspective view of an embodiment of an electrode plate according to the present disclosure.
Figure 18:
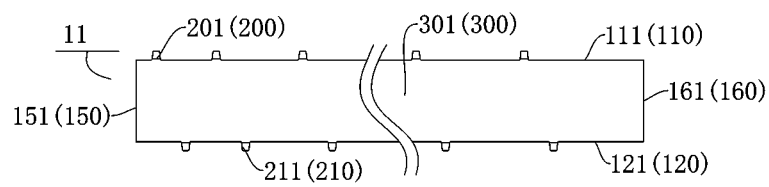
FIG. 18 is a perspective view of an embodiment of an electrode plate according to the present disclosure.
Figure 19:
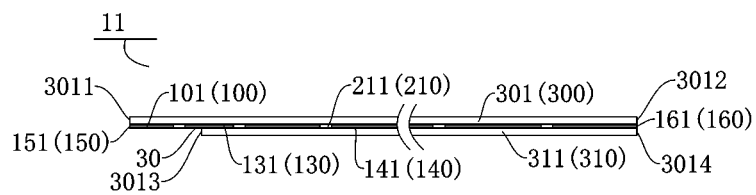
FIG. 19 is a perspective view of an embodiment of an electrode plate according to the present disclosure.
Figure 20:
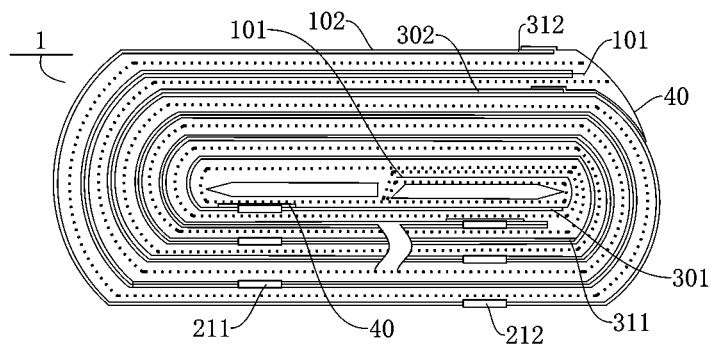
FIG. 20 is a perspective view of an embodiment of a battery cell according to the present disclosure.
Figure 21:
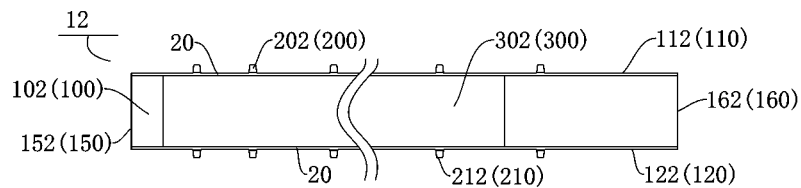
FIG. 21 is a perspective view of an embodiment of an electrode plate according to the present disclosure.
Figure 22:
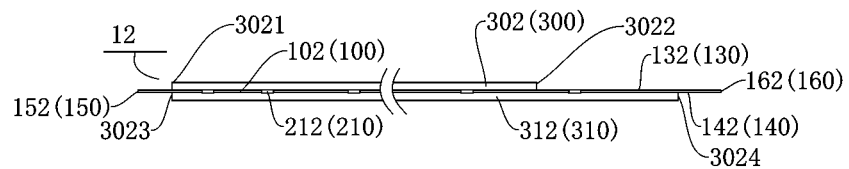
FIG. 22 is a perspective view of an embodiment of an electrode plate according to the present disclosure.

Referring to FIG. 1 to FIG. 5, an embodiment of the battery cell 1 according to the present disclosure includes an anode electrode plate 11, a cathode electrode plate 12, and a separator (as shown by a dotted line in FIG. 5). The anode electrode plate 11, the separator, and the cathode electrode plate 12 are sequentially stacked together and then wound by a rolling pin to form the battery cell 1. The separator is disposed between the anode electrode plate 11 and the cathode electrode plate 12, and is used to separate the anode electrode plate 11 from the cathode electrode plate 12, thereby avoiding a short circuit due to a contact between the anode electrode plate 11 and the cathode electrode plate 12.

Referring to FIGS. 1 to 4, the electrode plate includes a current collector, a plurality of first electrode tabs, a plurality of second electrode tabs, a first active material layer, and a second active material layer. It should be noted that the polarity of the second active material layer is the same as the polarity of the first active material layer. For the convenience of description and understanding, the current collector of the anode electrode plate 11 is defined as an anode current collector 101. The current collector of the cathode electrode plate 12 is defined as a cathode current collector 102. The first electrode tab of the anode electrode plate 11 is defined as the first anode electrode tab 201. The first electrode tab of the cathode electrode plate 12 is defined as a first cathode electrode tab 202; the second electrode tab of the anode electrode plate 11 is defined as the second anode electrode tab 211, and the second electrode tab of the cathode electrode plate 12 is the second cathode electrode tab 212. The first active material layer of the anode electrode plate 11 is defined as a first anode active material layer 301. The first active material layer of the cathode electrode plate 12 is defined as a first cathode active material layer 302. The second active material layer of the anode electrode plate 11 is defined as a second anode active material layer 311. The second active material layer of the cathode electrode plate 12 is defined as a second cathode active material layer 312.

Figure 2:
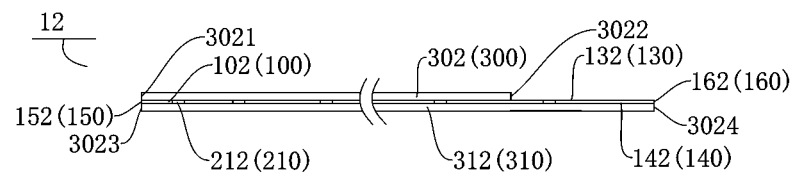
FIG. 2 is a perspective view of an embodiment of an electrode plate according to the present disclosure.

Referring to FIG. 1 and FIG. 2, the cathode current collector 102 is a rectangular aluminum foil. Along a width direction of the cathode current collector 102, the cathode current collector 102 includes a first cathode side 112 and a second cathode side 122 opposite to each other. A plurality of first cathode electrode tabs 202 is disposed on the first cathode side 112. One end of each of the first cathode electrode tabs 202 is coupled to the cathode current collector 102, and the other end extends out of the first cathode side 112. Each of the first cathode electrode tabs 202 may be connected to the cathode current collector 102 by soldering or may be integrally formed with the cathode current collector 102.

A plurality of second cathode electrode tabs 212 is disposed on the second cathode side 122 of the cathode current collector 102. One end of each of the second cathode electrode tabs 212 is coupled to the cathode current collector 102, and the other end extends out of the second cathode side 122. Each of the second cathode electrode tab 212 may be connected to the cathode current collector 102 by soldering or may be integrally formed with the cathode current collector 102. The first cathode electrode tabs 202 correspond one-to-one to the second cathode electrode tabs 212. Each of the first cathode electrode tabs 202 and the corresponding second cathode electrode tab 212 may be opposite to each other.

Referring to FIG. 1 and FIG. 2, along a thickness direction of the cathode current collector 102, the cathode current collector 102 includes a first cathode surface 132 and a second cathode surface 142 opposite to each other. The first cathode active material layer 302 is disposed on the first cathode surface 132. The second cathode active material layer 312 is disposed on the second cathode surface 142. A length of the second cathode active material layer 312 is equal to a length of the cathode current collector 102. A length of the first cathode active material layer 302 is less than the length of the second cathode active material layer 312. The thickness direction is defined as a stacking direction of the anode electrode plate 11, the separator, and the cathode electrode plate 12. The battery cell 1 is clockwise or counterclockwise wound along the length direction of the electrode plate.

Along the length direction of the cathode current collector 102, the cathode current collector 102 includes a first cathode end 152 and a second cathode end 162 opposite to each other. The first cathode active material layer 302 may include a first cathode end surface 3021 and a second cathode end surface 3022 opposite to each other. The second cathode active material layer 312 may include a third cathode end surfaces 3023 and a fourth cathode end surface 3024 opposite to each other. A distance between the first cathode end surface 3021 and the first cathode end 152 is less than a distance between the second cathode end surface 3022 and the second cathode end 162. A distance between the third cathode end surface 3023 and the first cathode end 152 is less than a distance between the fourth cathode end surface 3024 and the second cathode end 162. The distance between the second cathode end surface 3022 and the second cathode end 162 is greater than the distance between the fourth cathode end surface 3024 and the second cathode end 162.

Referring to FIGS. 1 and 2, two of the first cathode end 152, the first cathode end surface 3021, and the third cathode end surface 3023 are aligned with each other. That is, the first cathode end surface 3021 and the third cathode end surface 3023 are coplanar, and the first cathode end 152 and the first cathode end surface 3021 are coplanar. The second cathode end 162 is misaligned from the second cathode end surface 3022. The second cathode end 162 is aligned with the fourth cathode end surface 3024. That is, the second cathode end 162 and the second cathode end surface 3022 are not coplanar, and the second cathode end 162 and the fourth cathode end surfaces 3024 are coplanar.

Referring to FIGS. 3 and 4, the anode current collector 101 is a rectangular copper foil. Along a width direction of the anode current collector 101, the anode current collector 101 includes a first anode side 111 and a second anode side 121 opposite to each other. A plurality of first anode electrode tabs 201 is disposed on the first anode side 111. One end of each of the first anode electrode tabs 201 is coupled to the anode current collector 101, and the other end of the first anode electrode tab 201 protrudes from the first anode side 111. Each of the first anode electrode tabs 201 may be connected to the anode current collector 101 by soldering or may be integrally formed with the anode current collector 101.

A plurality of second anode electrode tabs 211 is disposed on the second anode side 121 of the anode current collector 101. One end of each of the second anode electrode tabs 211 is coupled to the anode current collector 101, and the other end of the second anode electrode tab 211 protrudes from the second anode side 121. Each of the second anode electrode tabs 211 may be connected to the anode current collector 101 by soldering or may be integrally formed with the anode current collector 101. The first anode electrode tabs 201 correspond one-to-one to the second anode electrode tabs 211. Each of the first anode electrode tab 201 and the corresponding second anode electrode tab 211 may be opposite to each other.

Referring to FIG. 3 and FIG. 4, along a thickness direction of the anode current collector 101, the anode current collector 101 includes a first anode surface 131 and a second anode surface 141 opposite to each other. The first anode active material layer 301 is disposed on the first anode surface 131. The second anode active material layer 311 is disposed on the second anode surface 141. A length of the first anode active material layer 301 is less than a length of the anode current collector 101, and a length of the second anode active material layer 311 is less than a length of the first anode active material layer 301.

Along a length direction of the anode current collector 101, the anode current collector 101 includes a first anode end 151 and a second anode end 161 opposite to each other. The first anode active material layer 301 may include a first anode end surface 3011 and a second anode end surface 3012 opposite to each other. The second anode active material layer 311 may include a third anode end surface 3013 and a fourth anode end surface 3014 opposite to each other. A distance between the first anode end surface 3011 and the first anode end 151 is less than a distance between the third anode end surface 3013 and the first anode end 151. A distance between the second anode end surface 3012 and the second anode end 161 is less than a distance between the fourth anode end surface 3014 and the second anode end 161. The distance between the first anode end surface 3011 and the first anode end 151 is greater than the distance between the second anode end surface 3012 and the second anode end 161. The distance between the third anode end surface 3013 and the first anode end 151 is greater than the distance between the fourth anode end surface 3014 and the second anode end 161.

Referring to FIGS. 3 and 4, two of the first anode end 151, the first anode end surface 3011, and the third anode end surface 3013 are misaligned in relation to the others. That is, the first anode end surface 3011 and the third anode end surface 3013 are not coplanar, and the first anode end 151 and the first anode end surface 3011 are not coplanar. The first anode end 151 and the third anode end surface 3013 are not coplanar. On a same horizontal plane, the first anode end surface 3011 is disposed between the first anode end 151 and the third anode end surfaces 3013. Two of the second anode end 161, the second anode end surface 3012, and the fourth anode end surface 3014 are misaligned in relation to the others. That is, the second anode end surface 3012 and the fourth anode end surface 3014 are not coplanar, the second anode end 161 and the second anode end surface 3012 are not coplanar, and the second anode end 161 and the fourth anode end surface 3014 are not coplanar. On a same horizontal plane, the second anode end surface 3012 is disposed between the second anode end 161 and the fourth anode end surface 3014.

Referring to FIG. 5, along the winding direction of the battery cell 1, the first cathode end 152 of the cathode electrode plate 12 is a starting end for winding. The first cathode end 152 is a head region of the cathode electrode plate 12. The second cathode end 162 of the cathode electrode plate 12 is a terminal end of the winding. The second cathode end 162 is the tail region of the cathode electrode plate 12. The first anode end 151 of the anode electrode plate 11 is a starting end for winding. The first anode end 151 is a head region of the anode electrode plate 11. The second anode end 161 of the anode electrode plate 11 is a terminal end of the winding. The second anode end 161 is a tail region of the anode electrode plate 11.

In the embodiment, by providing the first electrode tabs 200 and the second electrode tabs 210 and symmetrically arranging the first and second electrode tabs 200 and 210, the internal resistance of the battery cell 1 is reduced. The heat generated by the battery cell 1 is also reduced. By arranging the first cathode active material layer 302 and the second cathode active material layer 312 to be misaligned from each other at the tail region of the cathode current collector 102, the energy density of the battery cell 1 is further increased. Similarly, the anode electrode plate 11 also have misaligned structure at the head region, and an empty foil is included at each of the head region and the tail region.

Embodiment 2

Referring to FIGS. 6 to 10, the difference from Embodiment 1 is that in the embodiment, the length of the second cathode active material layer 312 is less than the length of the cathode current collector 102, and the length of the first cathode active material layer 302 is less than the length of the second cathode active material layer 312.

Two of the second cathode end 162, the second cathode end surface 3022, and the fourth cathode end surface 3024 are misaligned in relation to the others. That is, the second cathode end 162 and the second cathode end surface 3022 are not coplanar, and the second cathode end 162 and the fourth cathode end surface 3024 are not coplanar, and the second cathode end surface 3022 and the fourth cathode end surface 3024 are not coplanar.

In the embodiment, by providing the first electrode tabs 200 and the second electrode tabs 210 and symmetrically arranging the first and second electrode tabs 200 and 210, the internal resistance of the battery cell 1 is reduced. Heat generated by the battery cell 1 is also reduced. By arranging the first cathode active material layer 302 and the second cathode active material layer 312 to be misaligned from each other at the tail region of the cathode current collector 102, the energy density of the battery cell 1 is further increased. The cathode current collector 102 has no empty foil (i.e., copper foil or aluminum foil) at the head region, but an empty foil is included at the tail region. Similarly, the anode electrode plate 11 has the misaligned structure at the head region, and an empty foil is included at each of the head region and the tail region.

Embodiment 3

Referring to FIG. 11 to FIG. 14, different from Embodiment 2 is that the first cathode end 152 is misaligned from the first cathode end surface 3021. The first cathode end surface 3021 is aligned with the third cathode end surface 3023. That is, the first cathode end surface 3021 and the third cathode end surface 3023 are coplanar.

In the embodiment, by providing the first electrode tabs 200 and the second electrode tabs 210 and symmetrically arranging the first and second electrode tabs 200 and 210, the internal resistance of the battery cell 1 is reduced. The heat generated by the battery cell 1 is also reduced. The first cathode active material layer 302 and the second cathode active material layer 312 are misaligned from each other at the tail region of the cathode current collector 102, and an empty foil (i.e., copper foil or aluminum foil) is included at each of the head region and the tail region of the cathode current collector 102. An insulating layer 20 is disposed on a boundary between the empty foil and the cathode active layer (i.e., the first cathode active material layer 302 or the second cathode active material layer 312). The insulating layer 20 isolates the cathode electrode plate 12 from the anode electrode plate 11, thereby avoiding a contact between the cathode electrode plate 12 and the anode electrode plate 11 and enhancing the safety of the battery cell 1. Similarly, the anode electrode plate 11 has the misaligned structure at the head region, and an empty foil is included at each of the head region and the tail region.

Embodiment 4

Referring to FIGS. 16 to 20, the difference from Embodiment 1 is that the length of the first cathode active material layer 302 is less than the length of the cathode current collector 102. The length of the first cathode active material layer 302 is less than the length of the second cathode active material layer 312.

Two of the first cathode end 152, the first cathode end surface 3021, and the third cathode end surface 3023 are aligned. That is, the first cathode end surface 3021 and the third cathode end surface 3023 are coplanar, and the first cathode end 152, and the first cathode end surfaces 3021 are coplanar. The first cathode end surface 3021 is disposed between the first cathode end 152 and the third cathode end surface 3023. The second cathode end 162 and the second cathode end surface 3022 are misaligned from each other. The second cathode end 162 and the fourth cathode end surface 3024 are aligned with each other. That is, the second cathode end surface 3022 and the fourth cathode end surface 3024 are not coplanar. The second cathode end 162 and the second cathode end surface 3022 are not coplanar. The second cathode end 162 and the fourth cathode end surface 3024 are coplanar. The second cathode end surface 3022 is disposed between the second cathode end 162 and the fourth cathode end surface 3024.

The length of the second anode active material layer 311 is less than the length of the anode current collector 101. The length of the first anode active material layer 301 is less than the length of the second anode active material layer 311.

The first anode end surface 3011 is aligned with the first anode end 151. The first anode end 151 and the third anode end surface 3013 are misaligned. That is, the first anode end surface 3011 and the third anode end surface 3013 are not coplanar. The first anode end 151 and the first anode end surface 3011 are coplanar. The second anode end 161, the second anode end surface 3012, and the fourth anode end surface 3014 are all aligned. That is, the second anode end surface 3012 and the fourth anode end surface 3014 are coplanar, and the second anode end 161 and the second anode end surface 3012 are coplanar. The second anode end 161 and the fourth anode end surface 3014 are coplanar. The fourth anode end surface 3014 is disposed between the second anode end 161 and the second anode end surface 3012.

In the embodiment, by providing the first electrode tabs 200 and the second electrode tabs 210 and symmetrically arranging the first and second electrode tabs 200 and 210, the internal resistance of the battery cell 1 is reduced. The heat generated by the battery cell 1 is also reduced. The first cathode active material layer 302 and the second cathode active material layer 312 are aligned with each other at the head region of the cathode current collector 102. An insulating layer 20 is disposed on a boundary of the empty foil and the cathode active material layer (i.e., the first cathode active material layer 302 or the second cathode active material layer 312). The insulating layer 20 isolates the cathode electrode plate 12 from the anode electrode plate 11, thereby avoiding a contact between the cathode electrode plate 12 and the anode electrode plate 11 and enhancing safety of battery cell 1. The anode electrode plate 11 has the misaligned structure at the tail region, the increase in the winding radius reduces the likelihood of fracture at the single-sided foil.

Embodiment 5

Referring to FIGS. 21 to 25, difference from Embodiment 1 is that in the embodiment, the length of the first anode active material layer 301 is less than the length of the anode current collector 101, and the length of the second anode active material layer 311 is less than the length of the first anode active material layer 301.

Figure 23:
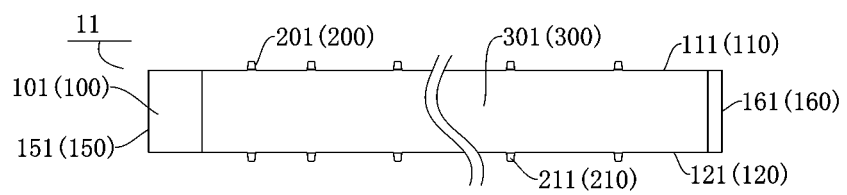
FIG. 23 is a perspective view of an embodiment of an electrode plate according to the present disclosure.
Figure 24:
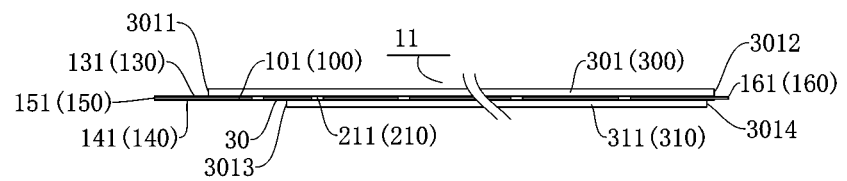
FIG. 24 is a perspective view of an embodiment of an electrode plate according to the present disclosure.
Figure 25:
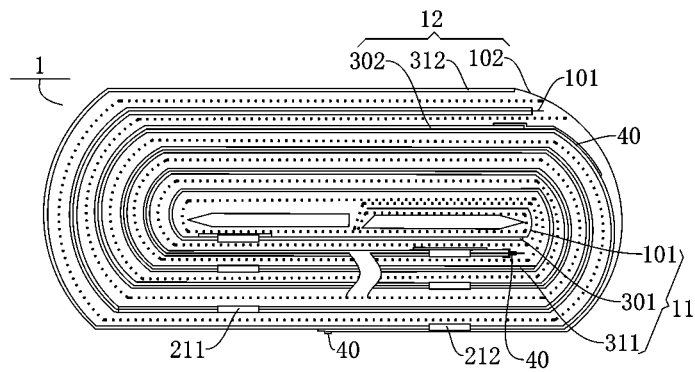
FIG. 25 is a perspective view of an embodiment of a battery cell according to the present disclosure.

Referring to FIG. 23 and FIG. 24, the first anode end 151 and the first anode end surface 3011 are misaligned from each other. The first anode end surface 3011 and the third anode end surface 3013 are misaligned from each other. That is, the first anode end 151 and the first anode end surface 3011 are not coplanar. The first anode end surface 3011 and the third anode end surface 3013 are not coplanar. The second anode end surface 3012 and the fourth anode end surface 3014 are aligned with each other. The second anode end 161 is misaligned from the second anode end surface 3012 and the fourth anode end surface 3014.

In the embodiment, by providing the first electrode tabs and the second electrode tabs and symmetrically arranging the first and second electrode tabs, the internal resistance of the battery cell 1 is reduced. The heat generated by the battery cell 1 is also reduced. The first cathode active material layer 302 and the second cathode active material layer 312 are misaligned at the tail region of the cathode current collector 102, which further increases the energy density of the battery cell 1. An empty foil (i.e., copper foil or aluminum foil) is disposed at each of the head region and the tail region of the cathode current collector 102. The anode electrode plate 11 has misaligned structure at the head region, and an empty foil is disposed at each of the head region and the tail region. Thus, the number of layers of the current collector is reduced, and the battery cell 1 may have an increased energy density.

Embodiment 6

Referring to FIG. 26 to FIG. 30, the difference from Embodiment 5 is that each of the first anode electrode tabs 201 and the corresponding second anode electrode tab 211 are misaligned from each other. That is, a connecting line of the first anode electrode tab 201 and the corresponding second anode electrode tab 211 is not parallel to the width direction of the anode electrode plate 11. Each of the first cathode electrode tabs 202 and the corresponding second cathode electrode tab 212 are misaligned from each other. That is, a connection line of the first cathode electrode tab 202 and the corresponding second cathode electrode tab 212 is not parallel to the width direction of the cathode electrode plate 12.

In the embodiment, by providing the first electrode tabs and the second electrode tabs and arranging the first and second electrode tabs to be misaligned from each other, the internal resistance of the battery cell 1 is reduced. The heat generated by the battery cell 1 is also reduced. Furthermore, the left side and the right side of the battery cell 1 are not distinguishable. The first cathode active material layer 302 and the second cathode active material layer 312 are misaligned from each other at the tail region of the cathode current collector 102. Neither the head region nor the tail region of the cathode current collector 102 has any empty foil (i.e., copper foil or aluminum foil). An insulating layer 20 is disposed on the boundary between the empty foil and the first cathode active material layer 302. The anode electrode plate 11 has misaligned structure at the head region, and neither of head region and tail region has any empty foil. Thus, the number of layers of the current collector is reduced, and the energy density of the battery cell 1 may be improved.

An embodiment of the electrode plate according to the present disclosure is as follows.

Referring to FIG. 1, an embodiment of an electrode plate 10 according to the present disclosure includes a current collector 100, a plurality of first electrode tabs 200, and a plurality of second electrode tabs 210. The current collector 100 includes a first side 110 and a second side 120 opposite to each other. The first electrode tabs 200 are coupled to the current collector 100, and protrude out of the first side 110. The second electrode tabs 210 are coupled to the current collector 100, and protrude out of the second side 120.

It should be noted that the term "a plurality of" mentioned above means two or more. In addition, the term "the first electrode tabs 200 are coupled to the current collector 100" means that signal may be transmitted between each of the first electrode tabs 200 and the current collector 100. The term "the second electrode tabs 210 are coupled to the current collector 100" means that signal may also be transmitted between each of the second electrode tabs 210 and the current collector 100.

In the embodiment of the electrode plate 10 according to the present disclosure, by providing the first electrode tabs 200 and the second electrode tabs 210 and arranging the first electrode tabs 200 and the second electrode tabs 210 at opposite sides of current collector 100, the internal resistance of the electrode plate 10 is reduced. The energy output efficiency of the electrode plate 10 is improved. The accumulation of heat when the electrode plate 10 is working is reduced. Energy is output at both sides of the electrode plate 10, which improves the performance of the electrode plate 10.

Referring to FIG. 1, in some embodiments of the present disclosure, the number of the first electrode tabs 200 and the number of the second electrode tabs 210 may be the same. It may be understood that the first electrode tabs 200 correspond one-to-one to the second electrode tabs 210. Thereby, the energy output at both sides of the current collector 100 is balanced.

Referring to FIG. 1, in some embodiments of the present disclosure, the first electrode tabs 200 and the second electrode tabs 210 may be symmetrical with respect to each other. It may be understood that each of the first electrode tabs 200 may correspond to one of the second electrode tabs 210, and each of the first electrode tabs 200 is symmetrical with respect to the corresponding second electrode tab 210. Therefore, the configuration and arrangement of the first electrode tabs 200 and the second electrode tabs 210 is facilitated.

Figure 26:
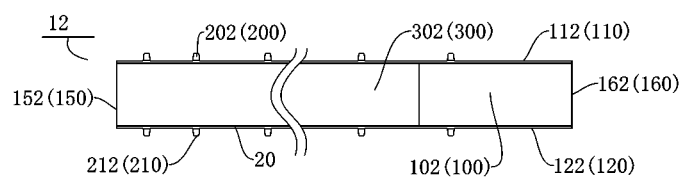
FIG. 26 is a perspective view of an embodiment of an electrode plate according to the present disclosure.
Figure 27:
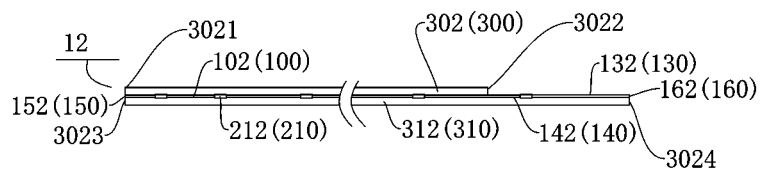
FIG. 27 is a perspective view of an embodiment of an electrode plate according to the present disclosure.
Figure 28:
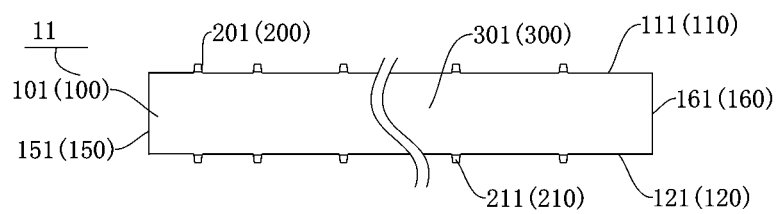
FIG. 28 is a perspective view of an embodiment of an electrode plate according to the present disclosure.
Figure 29:
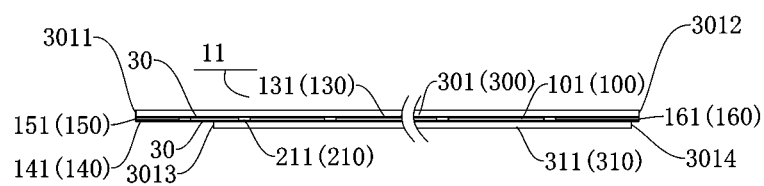
FIG. 29 is a perspective view of an embodiment of an electrode plate according to the present disclosure.
Figure 30:
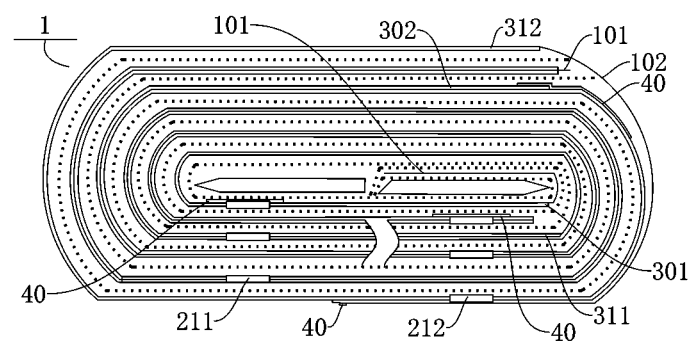
FIG. 30 is a perspective view of an embodiment of a battery cell according to the present disclosure.

Referring to FIGS. 26 to 28, in some embodiments of the present disclosure, the first electrode tabs 200 and the second electrode tabs 210 are misaligned from each other. It may be understood that an included angle between a connecting line between a center of any one of the first electrode tabs 200 and a center of any one of the second electrode tabs 210 and the first side 110 is acute. For example, the orthogonal projection of any one of the first electrode tabs 200 on the second side 120 does not overlap any one of the second electrode tabs 210.

Figure 31:
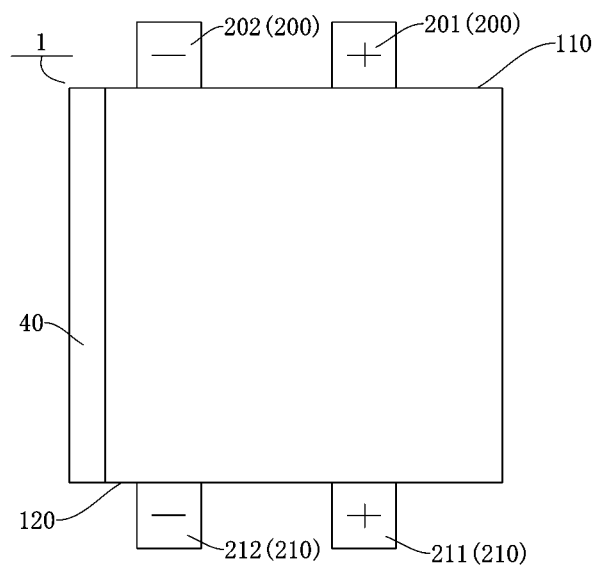
FIG. 31 is a perspective view of an embodiment of a battery cell according to the present disclosure.
Figure 32:
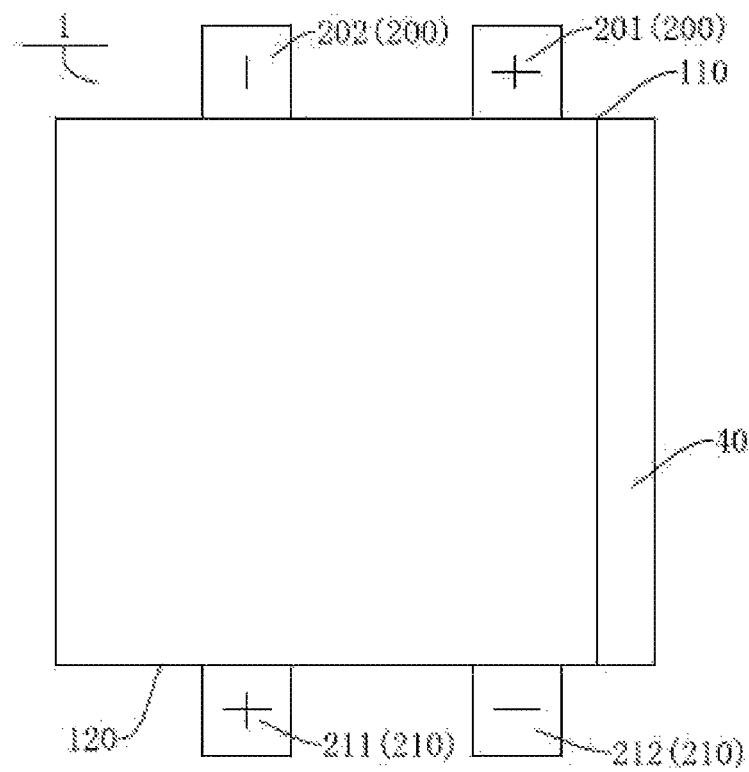
FIG. 32 is a perspective view of an embodiment of a battery cell according to the present disclosure.

Referring to FIG. 31 and FIG. 32, the electrode plate 10 may be the anode electrode plate 11. The first electrode tab 200 on the anode electrode plate 11 is the first anode electrode tab 201. The second electrode tab 210 on the anode electrode plate 11 is the second anode electrode tab 211. The electrode plate 10 may also be the cathode electrode plate 12. The first electrode tab 200 on the cathode electrode plate 12 is the first cathode electrode tab 202. The second electrode tab 210 on the cathode electrode plate 12 is the second cathode electrode tab 212. When the anode electrode plate 11 and the cathode electrode plate 12 are stacked and wound together along a direction from the second side 120 to the first side 110 the first anode electrode tab 201 is disposed at the right hand side of the first cathode electrode tab, and the second anode electrode tab 211 is disposed on the right hand side of the second cathode electrode tab 212. Thereby, installation of charging device for the battery cell 1 is facilitated.

Referring to FIG. 2, in some embodiments of the present disclosure, the current collector 100 includes a first surface 130 and a second surface 140 opposite to each other. The electrode plate 10 further includes a first active material layer 300 and a second active material layer 310. The first active material layer 300 is disposed on the first surface 130, and the second active material layer 310 is disposed on the second surface 140. The polarity of the second active material layer 310 is the same as the polarity of the first active material layer 300. For example, both the first active material layer 300 and the second active material layer 310 are anodes, or both the first active material layer 300 and the second active material layer 310 are cathodes.

Referring to FIG. 4, in some embodiments of the present disclosure, the electrode plate 10 includes a first end 150 and a second end 160. The first active material layer 300 and the second active material layer 310 are misaligned from each other at the first end 150. It may be understood that the first active material layer 300 may include a first end surface, the first end surface is a surface of the first active material layer 300 having the shortest distance from the first end 150. The second active material layer 310 may include a second end surface, and the second end surface is a surface of the second active material layer 310 having the shortest distance from the first end 150. The first end surface and the second end surface are not coplanar. For example, along a direction from the first end 150 to the second end 160, the first end surface may be disposed on the left side of the second end surface, or the first end surface may be disposed on the right side of the second end surface.

Referring to FIG. 2, in other embodiments of the present disclosure, the electrode plate 10 includes a first end 150 and a second end 160. The first active material layer 300 and the second active material layer 310 are aligned with each other at the first end 150.

Referring to FIG. 2, in some embodiments of the present disclosure, the first active material layer 300 and the second active material layer 310 can be aligned with or can be misaligned from each other. It may be understood that the first active material layer 300 may include a third end surface, and the third end surface is a surface of the first active material layer 300 having the shortest distance from the second end 160. The second active material layer 310 may include a fourth end surface, and the fourth end surface is a surface of the second active material layer 310 having the shortest distance from the second end 160. In some embodiments of the present disclosure, the third end surface may be not coplanar with the fourth end surface. For example, along a direction from the first end 150 to the second end 160, the third end surface may be disposed on the left side of the fourth end surface, or the third end surface may be disposed on the right side of the fourth end surface. In other embodiments of the present disclosure, the third end surface may be coplanar with the fourth end surface.

Referring to FIG. 2, in some embodiments of the present disclosure, the length of the first active material layer 300 may be less than or equal to the length of the second active material layer 310. It may be understood that the length of the first active material layer 300 may be less than the length of the second active material layer 310, or the length of the first active material layer 300 may be equal to the length of the second active material layer 310.

Referring to FIG. 4, in some embodiments of the present disclosure, the length of the first active material layer 300 may be greater than or equal to the length of the second active material layer 310. It may be understood that the length of the first active material layer 300 may be greater than the length of the second active material layer 310, or the length of the first active material layer 300 may be equal to the length of the second active material layer 310.

An embodiment of a battery cell 1 according to the present disclosure includes a separator and the electrode plate 10 as described above.

For example, the battery cell 1 may include two sets of electrode plates 10, namely an anode electrode plate 11 as anode and a cathode electrode plate 12 as cathode. The anode electrode plate 11 faces and is spaced from the cathode electrode plate 12. The separator is disposed between the anode electrode plate 11 and the cathode electrode plate 12.

In the embodiment of the battery cell 1 according to the present disclosure, the first electrode tabs 200 and the second electrode tabs 210 are disposed on the electrode plate 10. The polarity of the first electrode tabs 200 is the same as the polarity of the second electrode tabs 210. The first electrode tabs 200 and the second electrode tabs 210 are disposed on opposite sides of the current collector 100. Therefore, the internal resistance of the electrode plate 10 is reduced. The energy output efficiency of the electrode plate 10 is improved. The accumulation of heat when the electrode plate 10 is working is reduced. Energy output may be achieved at both sides of the electrode plate 10, which improves the performance of the electrode plate 10.

In some embodiments of the present disclosure, a coating layer 30 may be disposed between the first active material layer 300 and the current collector 100, which improves the conductivity of the electrode plate 10. Another coating layer 30 may be disposed between the second active material layer 310 and the current collector 100, which improves the conductivity of the electrode plate 10.

Referring to FIG. 5, in some embodiments of the present disclosure, an adhesive paper 40 is applied on at least one of the first end 150 and the second end 160. The adhesive paper 40 wraps the first end 150 or the second end 160.

In some embodiments of the present disclosure, an adhesive paper 40 is applied on a surface of the first electrode tab 200. The adhesive paper 40 wraps the first electrode tab 200. Another adhesive paper 40 is applied on a surface of the second electrode tab 210. The adhesive paper 40 wraps the second electrode tab 210.

Figure 33:
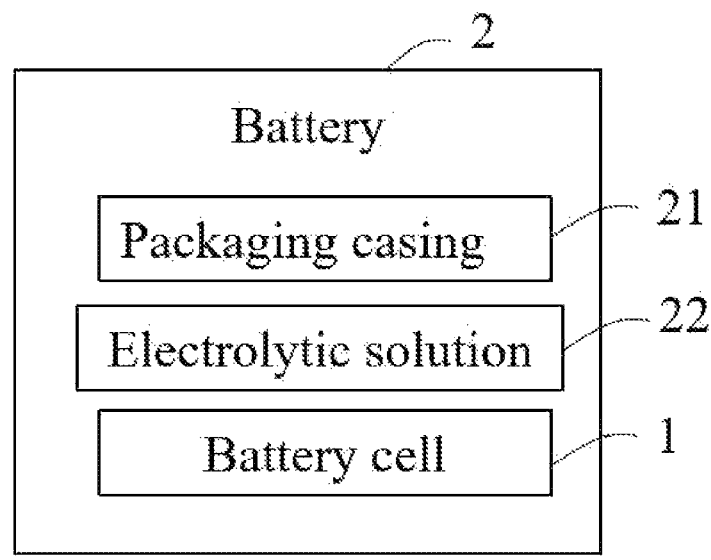
FIG. 33 is a perspective view of an embodiment of a battery according to the present disclosure.

Referring to FIG. 33, an embodiment of a battery 2 according to the present disclosure includes a packaging casing 21, an electrolytic solution 22 in the packaging casing 21, and the battery cell 1 as described above. For example, the packaging casing 21 may wrap the battery cell 1. The electrolyte 22 is disposed in the packaging casing 21 and around the battery cell 1. In the embodiment of the battery 2 according to the present disclosure, the first electrode tabs 200 and the second electrode tabs 210 are disposed on the electrode plate 10. The polarity of the first electrode tabs 200 is the same as the polarity of the second electrode tabs 210. The first electrode tabs 200 and the second electrode tabs 210 are disposed on opposite sides of the current collector 100. Therefore, the internal resistance of the electrode plate 10 is reduced. The energy output efficiency of the electrode plate 10 is improved. Accumulation of heat when the electrode plate 10 is working is reduced. Energy is output at both sides of the electrode plate 10, which improves the performance of the electrode plate 10.

In summary, the embodiment of the battery cell 1 according to the present disclosure has a small internal resistance, a high energy density, and a high-rate discharge performance. The charge and discharge current at the single-sided area is reduced. The risk of fracture is also reduced. Thereby, the problems in the existing battery cell which have misaligned electrode tabs are avoided, including risk of fracture of the single-sided region in the inner ring of the anode plate with consequent open circuit and precipitation of lithium at the single-sided region during the winding process. The electrode tabs are connected in parallel. Thus, the fracture of one electrode tab will not cause an open circuit. The charge and discharge of the battery is not affected. Furthermore, a current density in the single-sided area of the electrode plate 10 is reduced. The problem of failure of the single-sided area during winding is avoided. The folding of the electrode tabs caused by a large width of the electrode tabs is also be avoided.

In the description of the present disclosure, it should be understood that the terms "center", "length", "width", "thickness", "upper", "lower", "front", "rear", "left", "right", "vertical", "horizontal", "top", "bottom", "inner", "outside", "clockwise", "counterclockwise", "axial", "radial", "circumferential" may indicate an orientation or a positional relationship based on an orientation or a positional relationship shown in the drawings. Such orientation and such positional relationship are illustrative only and are not to indicate that the related device or element must have a specific orientation or a structure based on a specific orientation. Thus, the above terms do not limit the present disclosure.

In addition, the terms "first" and "second" are illustrative only, and are not to be taken as indicating or implying relative importance or the number of elements indicated. Therefore, the elements defined as "first" and "second" may explicitly or implicitly include one or more of the elements. In the description of the present disclosure, the term "a plurality" means two or more, unless specifically defined otherwise.

In the present disclosure, the terms "installation," "coupled," "connected," and "fixed" should be broadly understood, which may mean fixed connection, detachable connection, or integrally connection. The terms may also mean mechanical connection, electrical connection, or communication connection. The terms may also mean direct connection or indirect connected through an intermediate medium. The terms may also mean an internal connection between two elements or an interaction between two elements. To those having ordinary skill in the art, the specific meanings of the above terms in the present disclosure may be understood according to specific situations.

In the description of the present disclosure, the terms "one embodiment", "some embodiments", "examples", "specific examples", or "some examples" means specific features, which are described in conjunction with the embodiments or examples, structure, material, or characteristic, are included in at least one embodiment or example of the present disclosure. In the specification, the schematic expressions of the above terms are not necessarily directed to the same embodiment or the same example. Moreover, the particular features, structures, materials, or characteristics described may be combined with any one or more embodiments or examples in any suitable manner. In addition, those skilled in the art may combine different embodiments or examples and features of the different embodiments or examples described in the specification without contradiction.

Although the embodiments of the present disclosure have been shown and described, those having ordinary skill in the art can understand that changes may be made within the principles of the present disclosure, up to and including the full extent established by the broad general meaning of the terms used in the claims. It will, therefore, be appreciated that the embodiments described above may be modified within the scope of the claims.

What is claimed is:

1. A battery, comprising:
a packaging casing;
an electrolytic solution in the packaging casing; and
a battery cell, the battery cell comprising: an anode electrode plate, a cathode electrode plate, and a separator disposed between the anode electrode plate and the cathode electrode plate,
each of the anode electrode plate and the cathode electrode plate comprising:
a current collector comprising a first side and a second side opposite to each other, and a first surface and a second surface opposite to each other;
a first active material layer disposed on the first surface;

a second active material layer disposed on the second surface, a polarity of the second active material layer being the same as a polarity of the first active material layer;

a plurality of first electrode tabs coupled to the current collector and protruding out of the first side; and a plurality of second electrode tabs coupled to the current collector and protruding out of the second side;

the current collector of the cathode electrode plate comprises a first cathode end and a second cathode end opposite to each other, the first active material layer of the cathode electrode plate comprises a first cathode end surface and a second cathode end surface opposite to each other, the second active material layer of the cathode electrode plate comprises a third cathode end surface and a fourth cathode end surface opposite to each other; the current collector of the anode electrode plate comprises a first anode end and a second anode end opposite to each other, the first active material layer of the anode electrode plate comprises a first anode end surface and a second anode end surface opposite to each other, the second active material layer of the anode electrode plate comprises a third anode end surface and a fourth anode end surface opposite to each other;

wherein the first active material layer of the cathode electrode plate and the second active material layer of the cathode electrode plate are misaligned from each other at the second cathode end; the first active material layer of the anode electrode plate and the second active material layer of the anode electrode plate are misaligned from each other at the first anode end;

a distance between the first cathode end surface and the first cathode end is smaller than a distance between the second cathode end surface and the second cathode end, a distance between the third cathode end surface and the first cathode end is smaller than a distance between the fourth cathode end surface and the second cathode end, the distance between the second cathode end surface and the second cathode end is greater than the distance between the fourth cathode end surface and the second cathode end;

a distance between the first anode end surface and the first anode end is smaller than a distance between the third anode end surface and the first anode end, the distance between the first anode end surface and the first anode end is greater than a distance between the second anode end surface and the second anode end, the distance between the third anode end surface and the first anode end is greater than a distance between the fourth anode end surface and the second anode end.

2. The battery of claim 1, wherein a quantity of tabs in the plurality of first electrode tabs is the same as a quantity of tabs in the plurality of second electrode tabs.

3. The battery of claim 1, wherein the plurality of first electrode tabs and the plurality of second electrode tabs are symmetrical with respect to each other.

4. The battery of claim 1, wherein the plurality of first electrode tabs are misaligned from the plurality of second electrode tabs.

5. The battery of claim 1, wherein a length of the first active material layer is smaller than or equal to a length of the second active material layer.

* * * * *